United States Patent
Justice et al.

(10) Patent No.: US 11,766,140 B1
(45) Date of Patent: Sep. 26, 2023

(54) MULTI-INTERFACE APPARATUS

(71) Applicant: AMAZON TECHNOLOGIES, INC., Seattle, WA (US)

(72) Inventors: Gregory Kim Justice, Bremerton, WA (US); Nicholas Franklin, Framingham, MA (US); Rafiuddin Arif Ahud, Seattle, WA (US); Ziwei Xia, Seattle, WA (US); Nir Charny, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 690 days.

(21) Appl. No.: 16/822,770

(22) Filed: Mar. 18, 2020

(51) Int. Cl.
| A47F 13/00 | (2006.01) |
| A47F 5/08 | (2006.01) |
| G01G 3/14 | (2006.01) |
| G01G 19/414 | (2006.01) |
| G01G 19/52 | (2006.01) |
| G01G 21/23 | (2006.01) |
| G01G 3/13 | (2006.01) |

(52) U.S. Cl.
CPC ............ *A47F 13/00* (2013.01); *A47F 5/0823* (2013.01); *G01G 3/13* (2013.01); *G01G 3/14* (2013.01); *G01G 21/23* (2013.01); *G01G 19/4144* (2013.01)

(58) Field of Classification Search
CPC ......... A47F 13/00; A47F 5/0823; G01G 3/13; G01G 3/14; G01G 21/23; G01G 19/4144; G01G 19/52
See application file for complete search history.

(56) References Cited

U.S. PATENT DOCUMENTS

| 4,094,415 A * | 6/1978 | Larson ................. A47F 5/0823 211/85.15 |
| 5,356,106 A | 10/1994 | Trotta et al. |
| 6,530,486 B1 * | 3/2003 | Batting ................. A47F 5/0823 211/57.1 |
| 9,307,848 B2 | 4/2016 | Bernstein |
| 2005/0045573 A1 * | 3/2005 | Winig .................. A47F 5/0823 211/90.02 |

* cited by examiner

*Primary Examiner* — Randy W Gibson
(74) *Attorney, Agent, or Firm* — Lindauer Law, PLLC

(57) ABSTRACT

A multi-interface apparatus includes a crossbar to which a plurality of accessories using different mechanical interfaces may be attached and detached. Accessories such as wire hooks, shelves, bins, and so forth may be used. The different mechanical interfaces may include slatwall, pegboard, and saddle mount. Multiple accessories with different types of mechanical interfaces may be supported simultaneously by the crossbar. The crossbar may be instrumented. For example, load cells may be used to determine the weight on the crossbar.

20 Claims, 11 Drawing Sheets

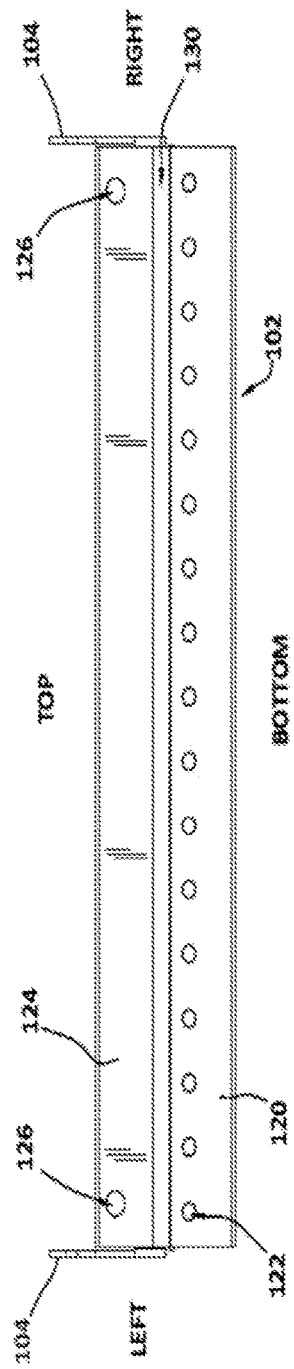
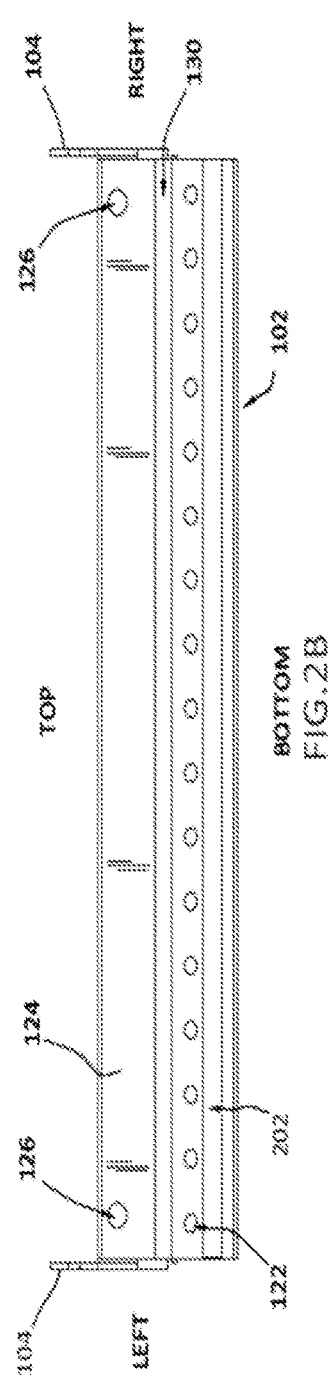
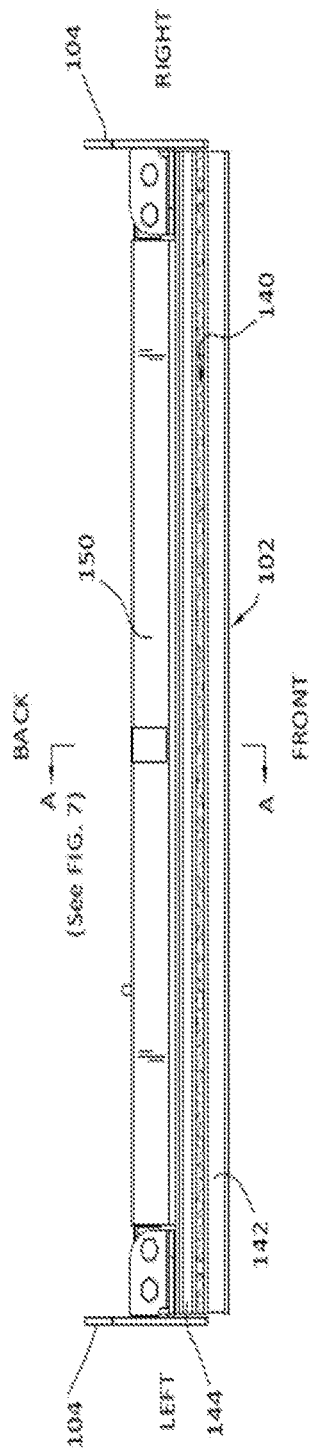

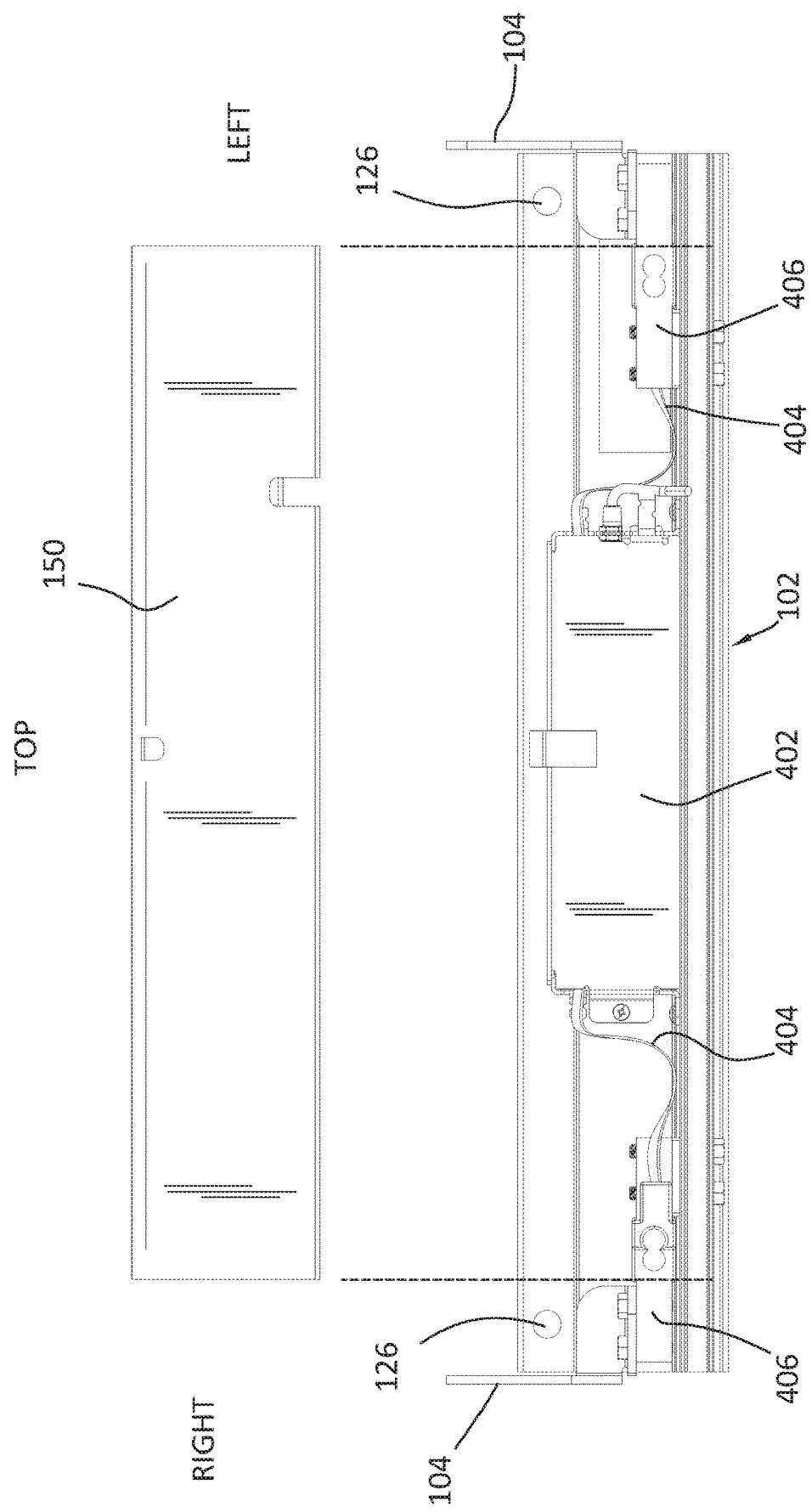

MULTI-INTERFACE APPARATUS

BACKGROUND

Fixtures may be used to hold accessories. These accessories may in turn be used to hold items. For example, a store or warehouse may use various accessories such as hooks, shelves, and so forth to hold items.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

FIG. 2A illustrates a front view of the multi-interface apparatus, according to some implementations.

FIG. 2B illustrates another implementation of a front view of the multi-interface apparatus, according to some implementations.

FIG. 3 illustrates a top view of the multi-interface apparatus, according to some implementations.

FIG. 4 illustrates a rear view of the multi-interface apparatus, according to some implementations.

Figure 1:
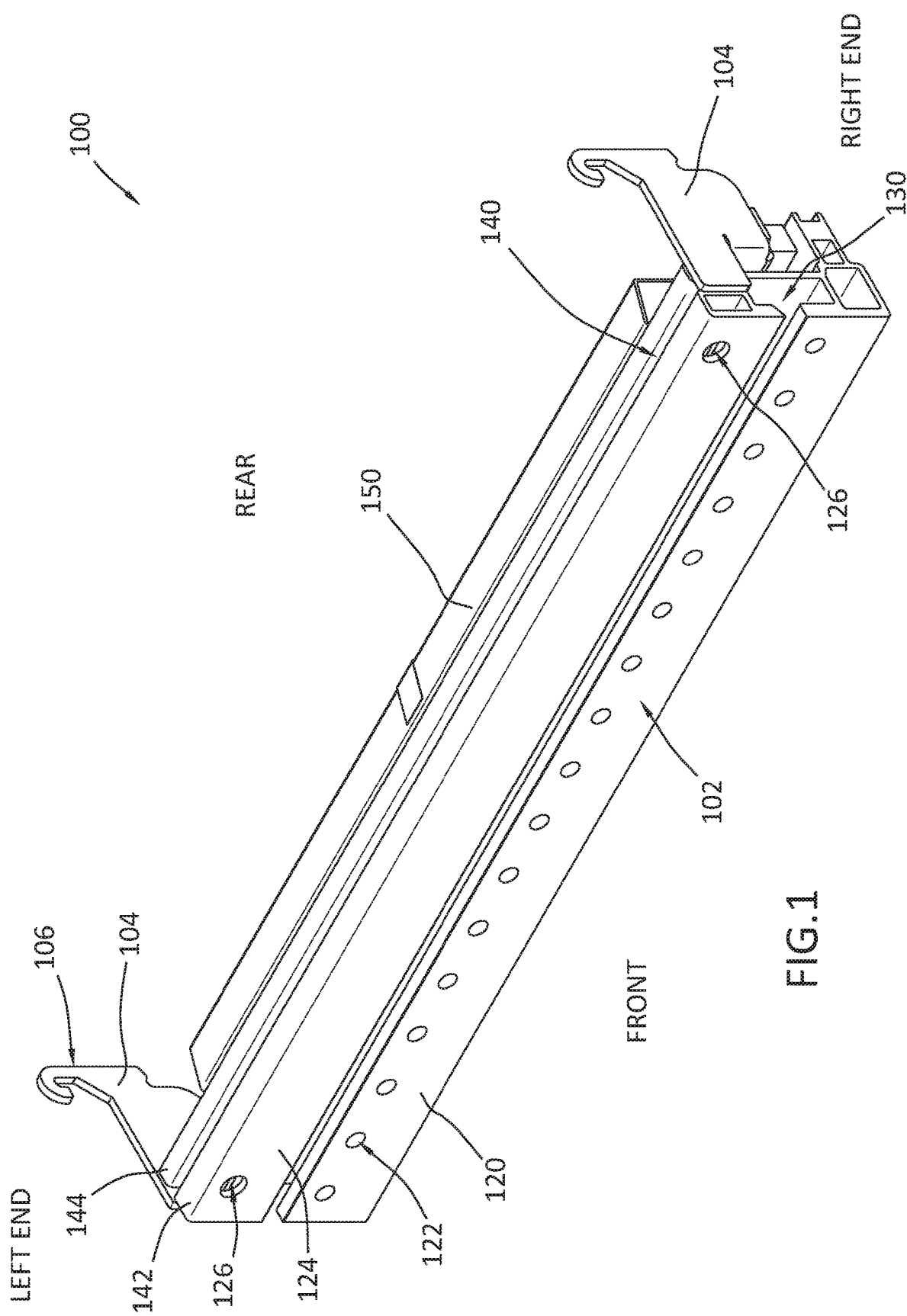
FIG. 1 illustrates a perspective view of a multi-interface apparatus having a plurality of mechanical interfaces to support various accessories, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A materials handling facility (facility) or other setting may utilize fixtures that in turn support accessories. These accessories are used to stow or otherwise hold items. These accessories may use different mechanical interfaces to attach to their corresponding fixture. For example, the fixtures may include a slatwall having one or more horizontal slots. Accessories such as shelves and hooks may have a corresponding flange that is inserted into, and engages a portion of, the horizontal slot. In another example, the fixtures may include a pegboard having a plurality of holes. Accessories may have corresponding pegboard hooks that are inserted into one or more holes. In yet another example, the fixtures may include a support that is generally rectangular in cross section and to which a saddle mount accessory may be supported.

However, these mechanical interfaces are incompatible with one another. An accessory that is made to engage a slatwall cannot be hung on a pegboard. A pegboard hook cannot be affixed to a saddle mount support. A saddle mount accessory cannot be affixed to a slatwall slot. This incompatibility causes significant operating limitations. For example, an item currently supported by a saddle mount accessory at a first location may need to be moved to a second location. However, the second location may have only a slatwall. The current saddle mount accessory cannot be used. As a result, a slatwall accessory suitable for that item must be procured. In some situations, there may not even be an accessory available that is suitable for that combination of item and mechanical interface.

This incompatibility may also decrease usability and lead to an adverse user experience. For example, if only a single type of mechanical interface is used in the facility to maintain compatibility, a particular kind of accessory may not be available for that type of mechanical interface. This may result in the stowage of items using an accessory that is less convenient or more difficult for the user to remove items from, to restock, and so forth.

The incompatibility may also increase costs associated with the facility. For example, if only a single type of mechanical interface is used, the operator of the facility is limited to a relatively small number of alternatives or substitutes for accessories. This could result in a lock-in situation and corresponding increases in the cost of accessories that are compatible with the mechanical interface in use by the facility.

Described in this disclosure is a multi-interface apparatus that is capable of simultaneously supporting accessories with different mechanical interfaces. The apparatus comprises a crossbar having a plurality of different mechanical features such as a slot on a front surface, plurality of holes in the front surface, and channel on an upper surface. The slot may be mechanically compatible with slatwall accessories. The plurality of holes are mechanically compatible with pegboard accessories. The channel and associated upper front surface are mechanically compatible with saddle mount accessories. As a result, the same crossbar may be used to support accessories with at least three different mechanical interface types.

Additional versatility is provided by different types of mounting brackets. For example, different mounting brackets may be affixed to the crossbar to allow the crossbar to be supported by a gondola, wire grid, drywall, and so forth.

The multi-interface apparatus may also include one or more sensors. In one implementation, a first weight sensor may be arranged proximate to a first end of the crossbar and a second weight sensor is arranged proximate to a second end of the crossbar. The weight sensors provide weight data about the weight on the respective end of the crossbar. This weight data may be used to determine a position along a long axis of the crossbar that is associated with adding or removing an item from the accessory. For example, the weight data may indicate a total weight change of −200 grams, with −180 grams measured by a first weight sensor on the left end of the crossbar and −20 grams measured by a second weight sensor on the right end of the crossbar. The removal of the item weighing 200 grams may be associated with a position proximate to the left end. This information may be used by an inventory management system during operation. For example, the total weight change may be used to determine a quantity of items used by dividing the total weight change by a per item weight. Continuing the example, the ratio of the weight changes measured by the left and right weight sensors provides data indicative of where the weight change took place. That location on the crossbar may be known to be associated with a particular type of item. Given the change in weight at that location, the inventory management system may infer the type of item that was removed.

The apparatus is relatively inexpensive to manufacture, comprising a minimal number of different pieces. For example, the crossbar may be extruded. The apparatus is also mechanically rugged and able to withstand the stresses associated with use in a commercial environment.

By using the devices and techniques described herein, operation of the facility may be improved. The crossbars may be mounted to convenient supports such as walls, slatwalls, wire grids, and so forth. This allows easy retrofitting, as well as convenient new installation. Once mounted, the crossbars support accessories using any of the plurality of mechanical interface types. This allows reuse of existing accessories, allows provisioning of potentially less expensive accessories without lock-in to a particular mechanical interface type, and allows ongoing flexibility to move the accessories in the facility. The crossbars may include sensors, such as weight sensors that provide weight data including a location of where a weight change took place. This weight data may be used for inventory management, further improving operation by allowing for automated determinations of items picked and placed, inventory on hand, and so forth.

Illustrative System

FIG. 1 illustrates a perspective view of a multi-interface apparatus (apparatus) 100 having a plurality of mechanical interfaces to support various accessories, according to some implementations.

The apparatus 100 comprises a crossbar 102. The crossbar 102 has a front side, a back side, a first end, a second end, a top side, and a bottom side. The crossbar 102 may comprise metal, plastic, ceramic, composite, and so forth. The crossbar 102 may be a unitary structure or may comprise one or more components. The components described in this disclosure may be formed via deposition, extrusion, casting, milling, stamping, and so forth. For example, the crossbar 102 may comprise metal formed by extrusion.

One or more mounting brackets 104 are used to attach the crossbar 102 to a support structure. For example, a first mounting bracket 104 may be connected to the first end of the crossbar 102 while a second mounting bracket 104 may be connected to the second end of the crossbar 102. The mounting bracket 104 may include one or more features to facilitate attachment to a support structure such as a gondola rack, wire grid, wall, and so forth. For example, the mounting bracket 104 depicted in FIG. 1 includes a shelf hook 106 to engage a corresponding feature in an upright member of a gondola rack.

The front side of the crossbar 102 may comprise a lower front surface 120 and an upper front surface 124. In one implementation the lower front surface 120 and the upper front surface 124 may share a common plane. During typical installation, the lower front surface 120 and the upper front surface 124 may be aligned vertically. A front mounting slot 130 is arranged between the lower front surface 120 and the upper front surface 124. The front mounting slot 130 may be configured to accept mounting features associated with a slatwall mechanical interface. For example, the front mounting slot 130 may receive a slatwall flange on an accessory. The front mounting slot 130 may have a first width at entry and a second width at an interior, describing an approximately "T" shaped cavity in cross section. The front mounting slot 130 may have a long axis that is parallel to a long axis of the crossbar 102. The front mounting slot 130 provides a first mechanical interface for supporting accessories.

In some implementations one or more indexing marks may be provided on one or more of the lower front surface 120 or the upper front surface 124. For example, the indexing marks may be used to facilitate placement of accessories on the crossbar 102.

The lower front surface 120 may have a plurality of holes 122. The plurality of holes 122 may be configured to accept mounting features associated with a pegboard mechanical interface. For example, the holes 122 may be spaced 25.4 millimeters (mm) on center and have a diameter of between 7 mm and 10 mm. The diameter of the holes 122 may be greater than typical to allow installation of accessories sized using English as well as Metric units. For example, pegboard hooks sized for English dimensions with 1 inch (or 25.4 mm) on center may be attached to the crossbar 102 as well as pegboard hooks sized for Metric units of 25 mm on center. The plurality of holes 122 may be arranged in a linear fashion that parallels the front mounting slot 130. In another implementation the upper front surface 124 may have a plurality of holes 122. In some implementations both the lower front surface 120 may have a first plurality of holes and the upper front surface 124 may have a second plurality of holes 122. The plurality of holes 122 may be arranged along a line that is parallel to the long axis of the crossbar 102. The plurality of holes 122 provide a second mechanical interface for supporting accessories.

One or more access holes 126 may extend through the front of the crossbar 102. For example, a first access hole 126 through the upper front surface 214 is shown proximate to a first end of the crossbar 102. The access hole(s) 126 may provide access to fasteners behind the crossbar 102. For example, a screwdriver may be inserted through the access hole 126 to manipulate a screw used to attach a mounting bracket 104 to a wall.

An upper portion of the crossbar 102 comprises a ridge 142 that is proximate to, or may be a portion of, the upper front surface 124. An upper mounting channel 140 is bounded by the ridge 142 and an upper rear surface 144. The upper mounting channel 140 may comprise a long axis that is parallel to the long axis of the crossbar 102. During typical installation, the ridge 142 may be aligned horizontally. A distance between an exterior or forward face of the upper front surface 124 and an exterior or rearward face of the ridge 142 as it forms the upper mounting channel 140 may permit a saddle mount hook to be supported. For example, the upper front surface 124 and the ridge 142 together form a ridge onto which a saddle mount hook may be placed. This ridge provides a third mechanical interface for supporting accessories.

A rear cover 150 is also shown. In implementations where the apparatus 100 includes electronics, the rear cover 150 may cover these electronics or other devices.

As described in this disclosure, components may be affixed, connected, or otherwise joined to one another in several ways. For example, two components may have complementary features that mechanically engage one another, such as a tab and corresponding slot. In another example, fasteners such as rivets, bolts, screws, cams, and so forth may be used. These may be removable fasteners such as bolts and screws that allow components to be joined and disjoined as needed. In yet another example two or more components may be attached using adhesives, welding, crimping, and so forth.

FIG. 2A illustrates a front view of the multi-interface apparatus 100, according to some implementations. Visible are the access holes 126 that may be present in some implementations. In other implementations the access holes 126 may be omitted. In this view the front mounting slot 130 located between the lower front surface 120 and the upper front surface 124 is visible, as are the plurality of holes 122. Also shown are mounting brackets 104 on each end of the crossbar 102. The front mounting slot 130 has a first slot height, or distance between the edges of the slot at the slot entry.

FIG. 2B illustrates another implementation of a front view of the multi-interface apparatus 100, according to some implementations. A second mounting slot 202 may be present on the front side. The second mounting slot 202 may be parallel to the front mounting slot 130. The second mounting slot 202 may have a second slot height that is different from the first slot height. The second mounting slot 202 may differ from the front mounting slot 130 in other ways. For example, the dimensions, geometry, cross section, and so forth may differ. The second mounting slot 202 may provide another mechanical interface for use in affixing accessories.

Figure 7:
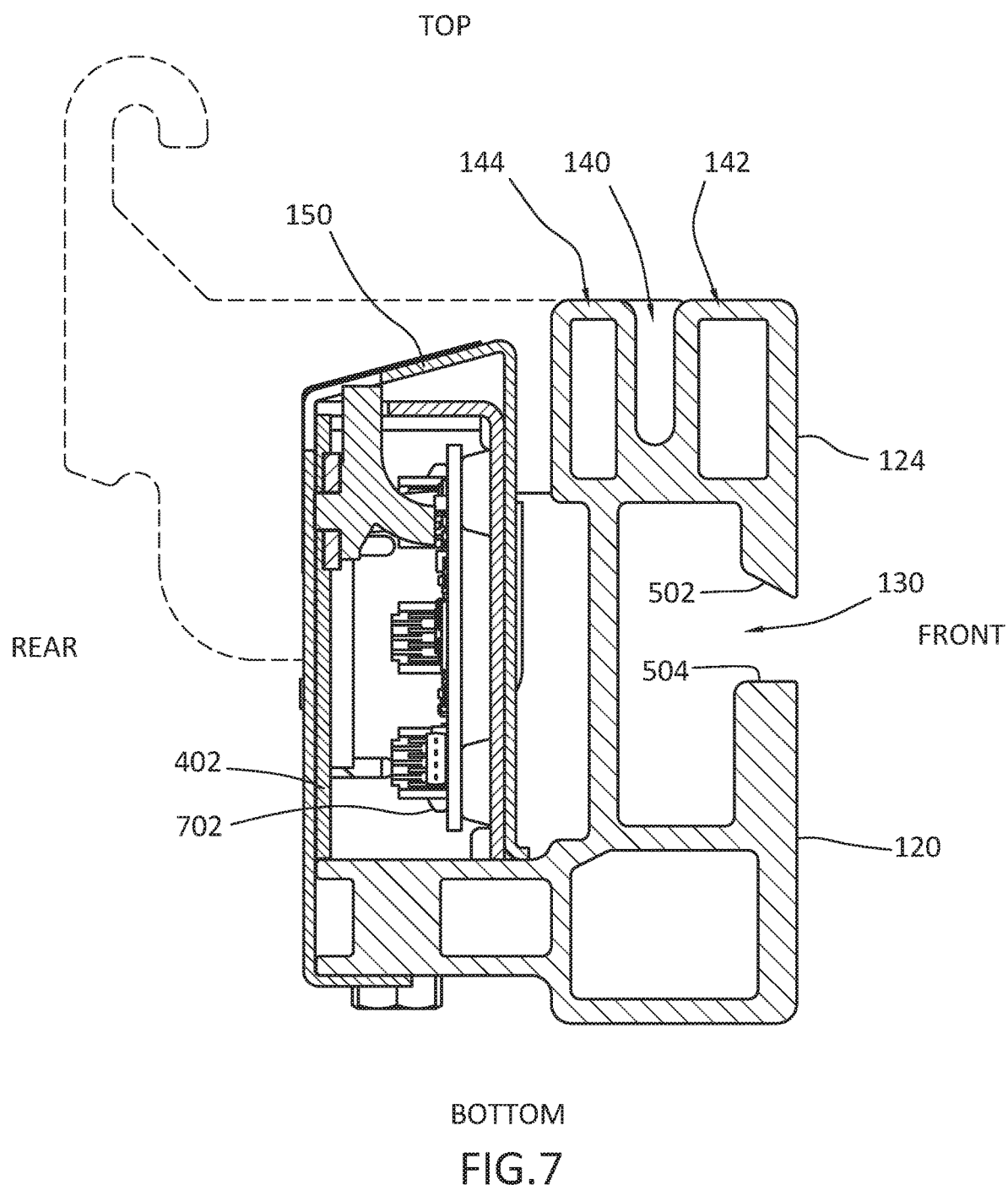
FIG. 7 illustrates a cross section of the multi-interface apparatus, according to some implementations.

FIG. 3 illustrates a top view of the multi-interface apparatus 100, according to some implementations. In this view, the upper mounting channel 140 is shown. The upper mounting channel 140 is bounded by the ridge 142 on the side proximate to the front of the crossbar 102 and the upper rear surface 144 on the side proximate to the rear of the crossbar 102. A cross-sectional line A-A is shown. The corresponding cross section is depicted in FIG. 7.

FIG. 4 illustrates a rear view of the multi-interface apparatus 100, according to some implementations. A back side of the access holes 126 through the crossbar 102 are visible.

In this view, the rear cover 150 has been moved to reveal several components that may be present in some implementations of the apparatus 100. The apparatus 100 may include electronics 702 protected by an electronics compartment cover 402. The electronics 702 may include, but are not limited to a power supply, one or more processors, analog to digital converters, a wireless communication interface, and so forth.

One or more wiring harnesses 404 may connect the electronics 702 to one or more weight sensors 406. The weight sensors 406 may comprise load cells as shown here, piezoelectric transducers, and so forth. In this illustration, a first end of a first weight sensor 406 is affixed to the left end of the crossbar 102. A second end of the first weight sensor 406 is affixed to a left mounting bracket 104. Likewise, a first end of a second weight sensor 406 is affixed to the right end of the crossbar 102. A second end of the second weight sensor 406 is affixed to a right mounting bracket 104. With this arrangement, the weight sensors 406 are able to provide information about weight or weight changes of a load on the crossbar 102. For example, as items are added to or removed from accessories supported by the crossbar 102, weight data may be generated. This weight data may be sent to an inventory management system 1120 or other system.

The wiring harnesses 404 may comprise individual insulated wires, ribbon cable, flexible printed circuit (FPC), and so forth. In some implementations at least a portion of the wiring harnesses 404 may be affixed to a portion of the crossbar 102. For example, if the portion of the crossbar 102 comprises an electrical conductor, such as metal, the presence of the electrical conductor may act as a ground plane, reducing electrical interference. This reduction in electrical interference results in a significant improvement in the quality of the signal received by the electronics from the weight sensor 406. In one implementation, the crossbar 102 may comprise metal, at least a portion of the wiring harness 404 may be taped, glued, or clipped to the metal.

Figure 5:
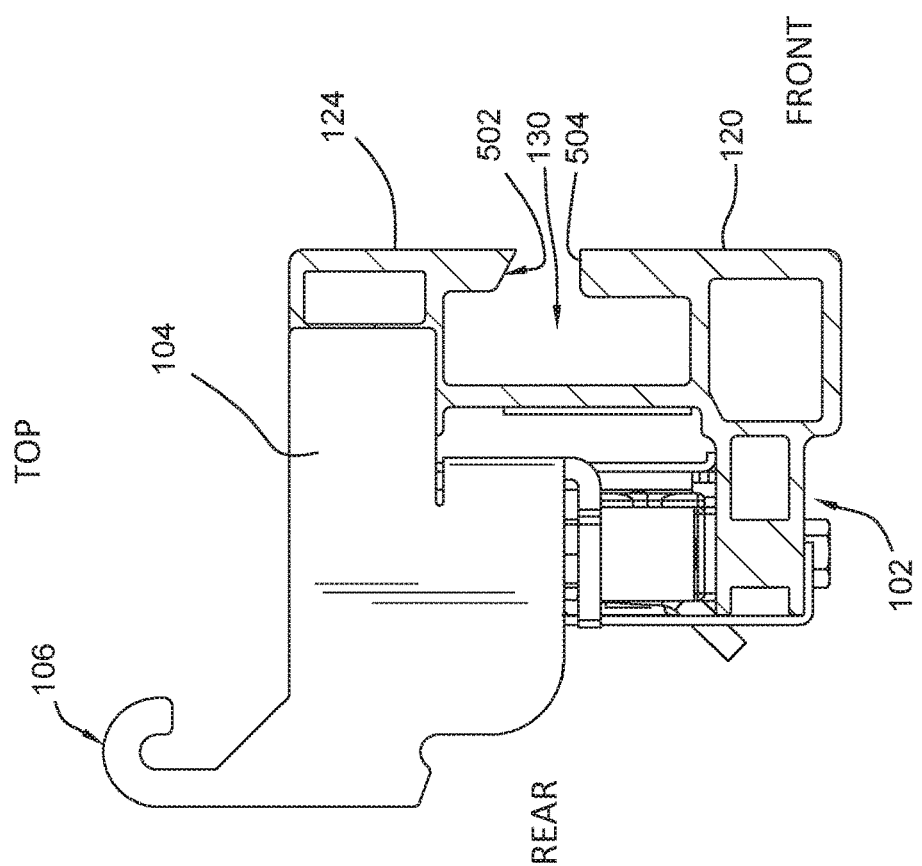
FIG. 5 illustrates a side view of a left end the multi-interface apparatus, according to some implementations.

FIG. 5 illustrates a side view of a left end the multi-interface apparatus 100, according to some implementations. In this view the mounting bracket 104 with the shelf hook 106 is visible. Also visible is the upper front surface 124, the lower front surface 120, and the front mounting slot 130.

In some implementations the opening of the front mounting slot 130, or slot entry, may be configured to provide a bevel or angled portion as illustrated here. An upper edge 502 of the front mounting slot 130 is shown. The upper edge 502 may have an angle of between 70 and 30 degrees relative to a plane of the upper front face 124. A lower edge 504 of the front mounting slot 130 is also shown. The lower edge 504 may have an angle of between 85 and 95 degrees relative to a plane of the lower front surface 120.

The front mounting slot 130 may exhibit a "T" shaped cross section as shown here. The slot entry has a first width while a slot interior has a second width that is greater than the first width. In other implementations, other cross sectional shapes may be used.

In some implementations the crossbar 102 may include one or more voids or spaces that are not filled with material. This may be done to reduce the overall weight of the crossbar 102, reduce the quantity of materials used, and so forth. In some implementations the voids may be omitted, filled, or have another member inserted there. This may be done to eliminate a void for potential contaminants to accumulate, to increase strength or rigidity of the crossbar 102, and so forth.

Figure 6:
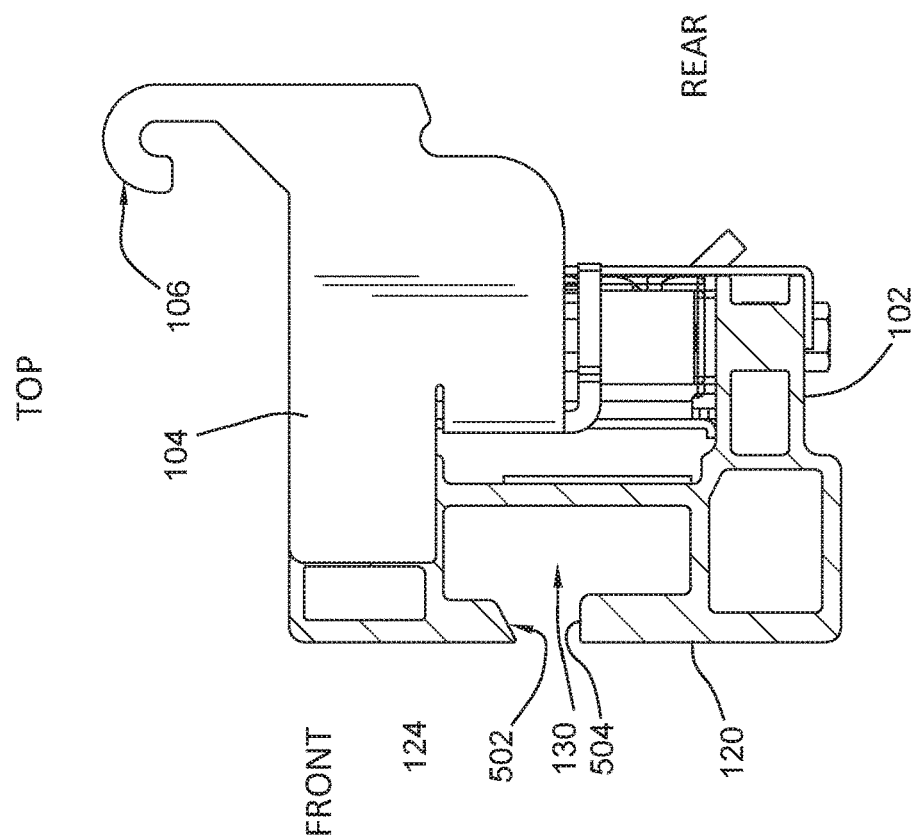
FIG. 6 illustrates a side view of a right end the multi-interface apparatus, according to some implementations.

FIG. 6 illustrates a side view of a right end the multi-interface apparatus 100, according to some implementations.

FIG. 7 illustrates a cross section of the multi-interface apparatus 100 along line A-A as shown in FIG. 3, according to some implementations. The ridge 142, upper mounting channel 140, and the upper rear surface 144 are visible. In some implementations the upper rear surface 144 may be omitted.

Also visible are the electronics 702. In some implementations a conformal coating may be applied to the electronics 702. The electronics 702 may be retained within a compartment that is accessible by removing the electronics compartment cover 402. In the implementation depicted here, the rear cover 150 is in place, and further enshrouds the compartment containing the electronics 702.

In other implementations, other cross sectional configurations may be used. For example, voids may be omitted, the dimensions of features may be changed, and so forth. In one implementation, a second ridge (not shown) may be formed into the bottom side of the crossbar 102. The second ridge may have a different width and height from the first ridge 142, suitable for a different size of saddle hook. In some implementations, the crossbar 102 may be mounted upside down (compared to the illustration shown), such that the first ridge 142 is on the bottom, while the second ridge is on the top. This may allow the single crossbar 102 to accommodate a fourth mechanical interface.

Figure 8:
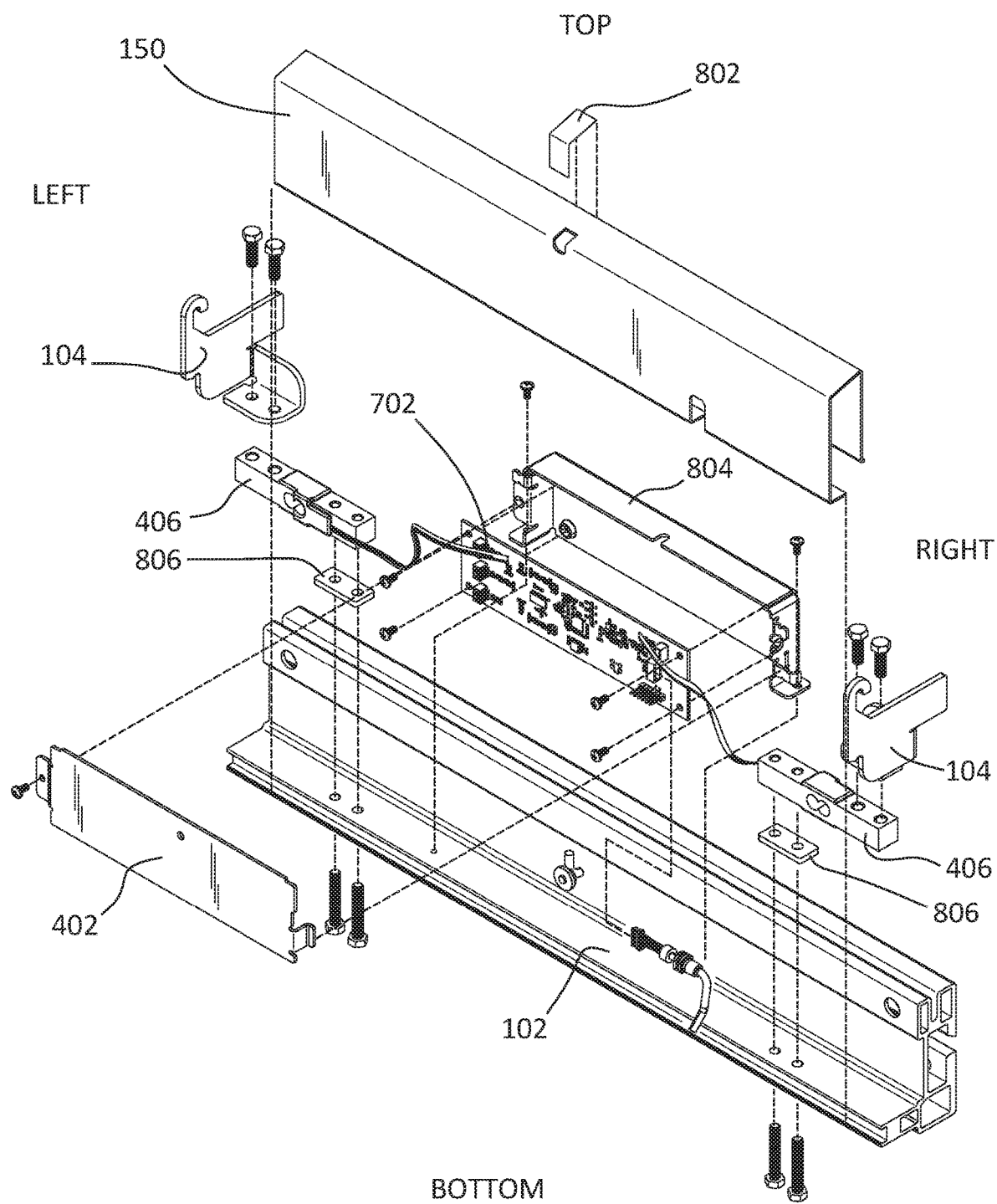
FIG. 8 is an expanded view of the multi-interface apparatus, according to some implementations.

FIG. 8 is an expanded perspective view from behind the multi-interface apparatus 100, according to some implementations. Visible in this illustration is a top tab 802 that may be used to secure the rear cover 150 to the crossbar 102. Also shown is an electronics compartment 804 within which the electronics 702 may be emplaced. The electronics compartment cover 402 may be used to close the opening in the electronics compartment 804.

In the implementation depicted here, the weight sensors 406 comprise load cells. A spacer 806 may be placed between a first end of the load cell and the crossbar 102. This spacer 806 provides clearance for displacement of the second end of the load cell.

In some implementations one or more of the components may be configured to facilitate some movement of the mounting bracket 104 with respect to the crossbar 102. For example, one or more of the mounting holes in a structure of the weight sensor may be oversized relative to the fastener inserted therein. This may allow the mounting bracket 104 to move with respect to the crossbar 102. This movement facilitates installation or removal of the apparatus 100 with respect to a rack or other supporting structure. For example, this movement may reduce or eliminate binding of the mounting bracket 104 with the supporting structure. The spacer 806 may comprise metal, ceramic, plastic, and so forth. To facilitate movement, the spacer 806 may comprise a material that provides a reduced friction surface. For example, the spacer 806 may comprise high-density polyethylene (HDPE) plastic.

Figure 9A:
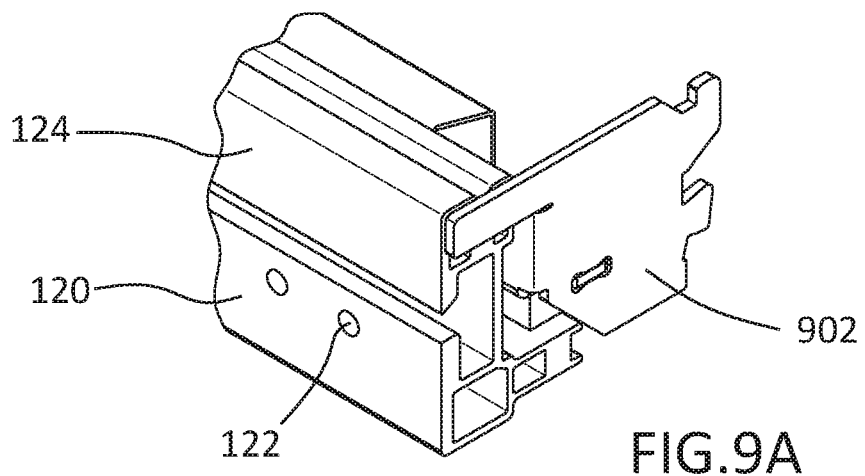
FIGS. 9A, 9B, and 9C depict different mounting brackets that may be affixed to the end of the crossbar of the multi-interface apparatus, according to some implementations.
Figure 9B:
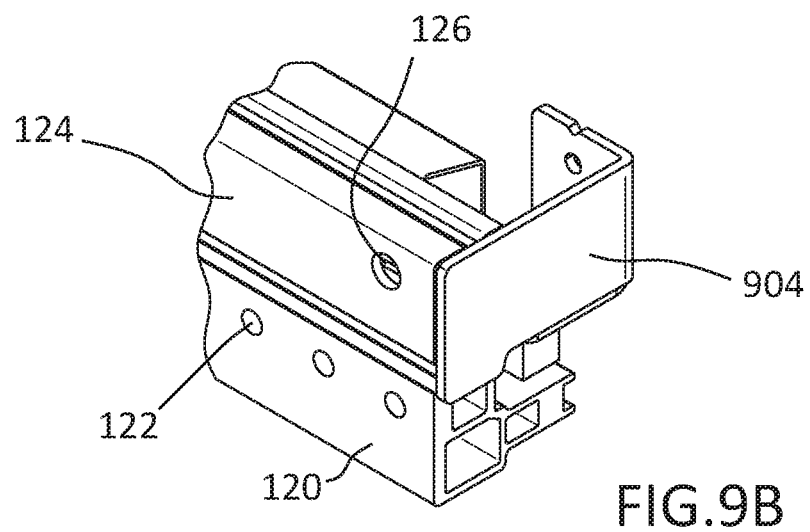
Figure 9C:
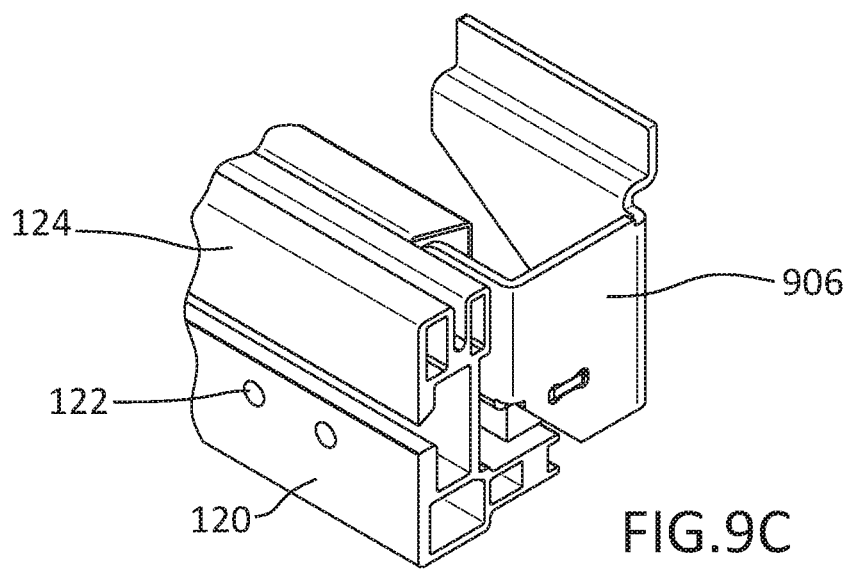

FIGS. 9A, 9B, and 9C depict different mounting brackets that may be affixed to the end of the crossbar of the multi-interface apparatus 100, according to some implementations. The crossbar 102 may be used with a variety of different mounting brackets, further increasing the versatility of the apparatus 100.

FIG. 9A depicts a mounting bracket 902 that permits attachment to a gondola upright.

FIG. 9B depicts a mounting bracket 904 that permits attachment to a wall surface. For example, a screw may be inserted through the access hole 126, through a hole in the mounting bracket 904, and used to secure the mounting bracket 904 to a wall.

FIG. 9C depicts a mounting bracket 906 that permits attachment to a wire grid structure.

In other implementations, other mounting bracket configurations may be used in conjunction with the crossbar 102.

Figure 10A:
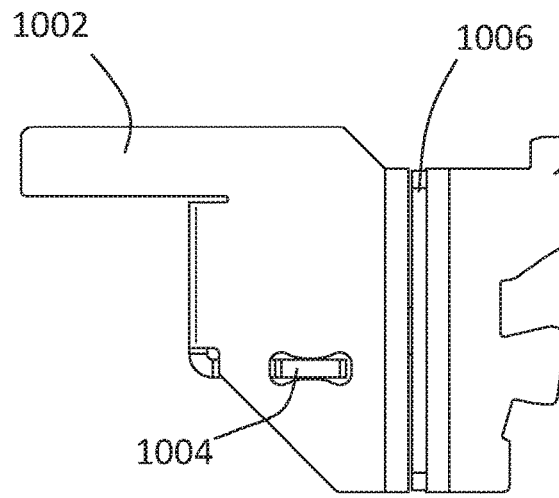
FIGS. 10A, 10B, and 10C depict a mounting bracket that provides relative movement between the mounting bracket and the crossbar, according to one implementation.
Figure 10B:
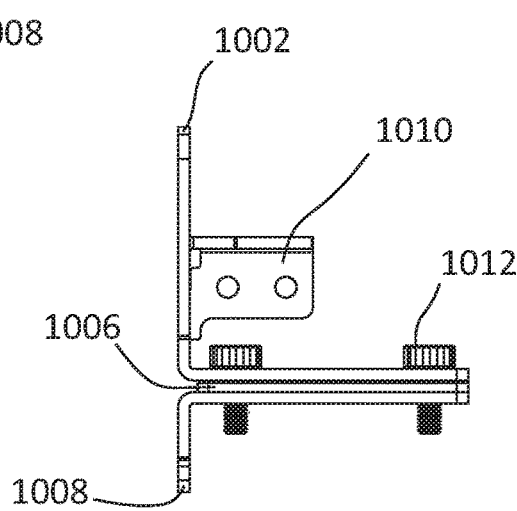
Figure 10C:
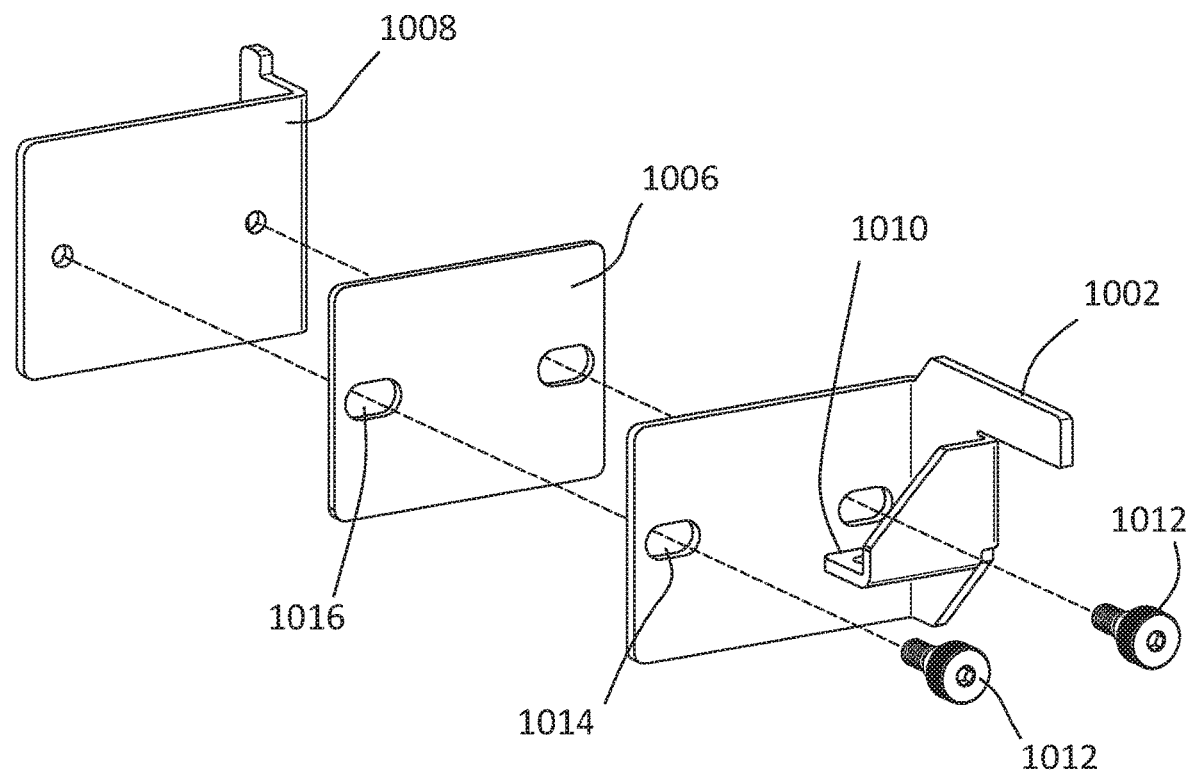

FIGS. 10A, 10B, and 10C depict a bracket assembly that provides relative movement between the mounting bracket and the crossbar 102, according to one implementation. As mentioned above, the apparatus 100 may be attached to a support structure, such as pair of vertical uprights, a wire grid, and so forth. To reduce or eliminate possible binding between the support structure and a mounting bracket during installation or removal, the apparatus 100 may include mechanisms to permit some relative and independent movement of one or more of the mounting brackets that engage the support structure.

FIG. 10A depicts a side view of the bracket assembly comprising a crossbar bracket 1002 including a first attachment feature 1004. A first face of the crossbar bracket 1002 is in contact with a first face of a spacer 1006. A second face of the spacer 1006 is in contact with a first face of a mounting bracket 1008. The mounting bracket 1008 may include one or more mechanical engagement features, such as tabs, hooks, teeth, slots, and so forth.

The spacer 1006 may comprise metal, ceramic, plastic, and so forth. To facilitate movement, the spacer 1006 comprise a material that provides a reduced friction surface. For example, the spacer 1006 may comprise HDPE.

FIG. 10B depicts a top view of the bracket assembly. A mounting feature 1010 is configured to be affixed to one end of a weight sensor 406 (not shown). As shown here, the mounting feature 1010 may comprise a tab with two holes through the tab. A pair of bolts 1012 are also visible, joining the crossbar bracket 1002, the spacer 1006, and the mounting bracket 1008 together. In other implementations, other types of fasteners may be used.

FIG. 10C depicts an expanded view of the bracket assembly. In this view, a pair of holes 1014 in the first face of the crossbar bracket 1002 are visible. Each hole 1014 is larger in at least one dimension than the diameter of the bolt 1012. For example, the width of each hole 1014 is greater than the diameter of the bolt 1012.

Also visible is a pair of holes 1016 in the spacer 1006. Each hole 1016 is larger in at least one dimension than the diameter of the bolt 1012. The size, shape, and arrangement of the holes 1016 may correspond to the holes 1014.

The mounting bracket 1008 may include threaded holes, or nuts may be used to secure the bolts 1012.

Once assembled, the bolts 1012 retain the various parts of the bracket assembly together. As a result of the holes 1014 being larger than the diameter of the bolt 1012 passing through the holes 1014, the crossbar bracket 1002 may move relative to the mounting bracket 1008 and parallel to a plane of the spacer 1006. For example, the mounting bracket 1008 may move left and right with respect to the crossbar bracket 1002.

This movement of the mounting bracket 1008 relative to the crossbar bracket 1002, and the crossbar 102 that it is affixed to, facilitates installation or removal of the apparatus 100 with respect to a rack or other supporting structure.

Figure 11:
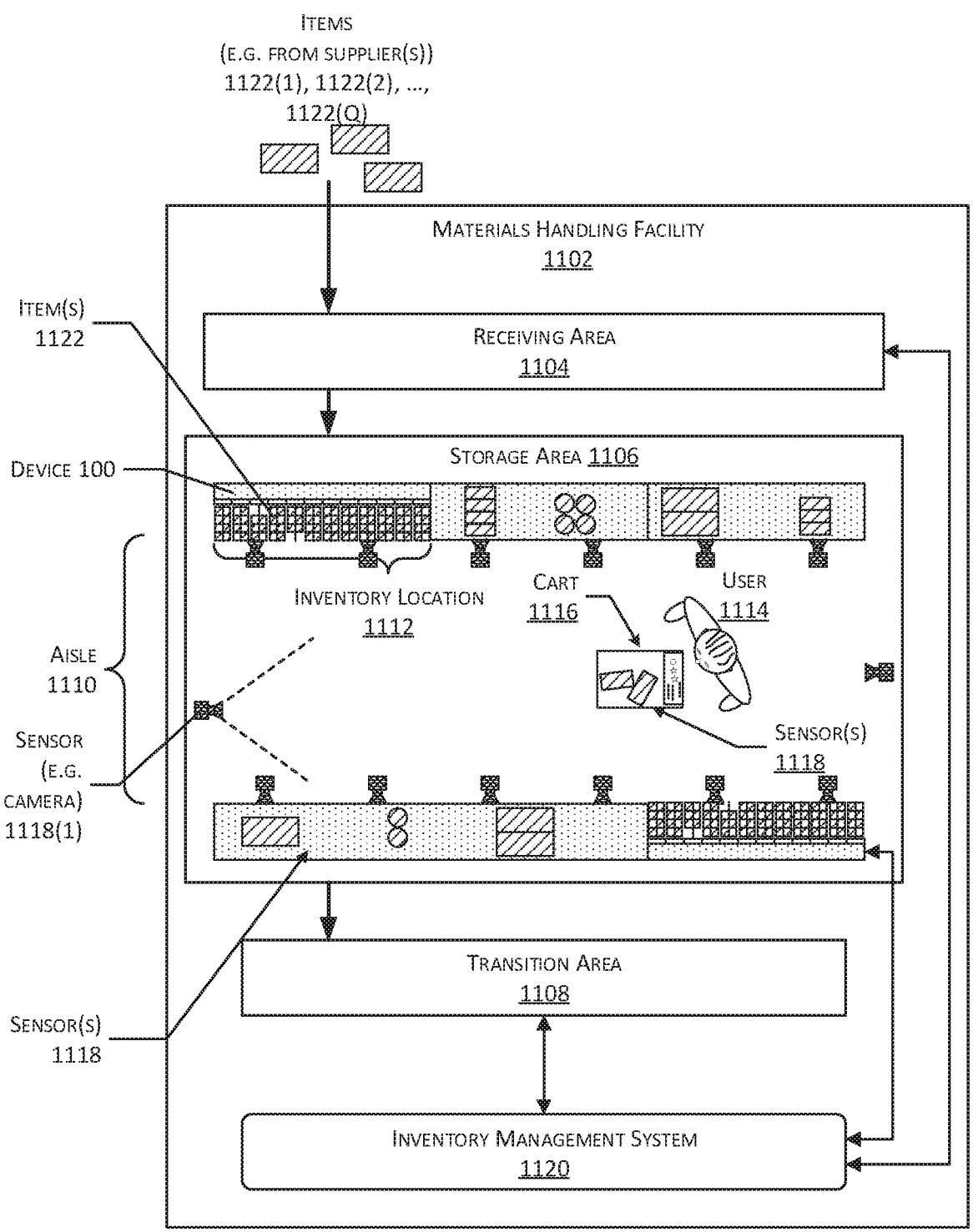
FIG. 11 is a block diagram illustrating a materials handling facility (facility) using the device, according to some implementations.

FIG. 11 is a block diagram 1100 illustrating a material handling facility (facility) 1102 using the apparatus 100, according to some implementations. A facility 1102 comprises one or more physical structures or areas within which one or more items 1122(1), 1122(2), . . . , 1122(Q) may be held. The items 1122 may comprise physical goods, such as books, pharmaceuticals, repair parts, electronic gear, and so forth.

The facility 1102 may include one or more areas designated for different functions with regard to inventory handling. In this illustration, the facility 1102 includes a receiving area 1104, a storage area 1106, and a transition area 1108.

The receiving area 1104 may be configured to accept items 1122, such as from suppliers, for intake into the facility 1102. For example, the receiving area 1104 may include a loading dock at which trucks or other freight conveyances unload the items 1122. In some implementations, the items 1122 may be processed, at the receiving area 1104, to generate at least a portion of the item data. For example, an item 1122 may be weighed, imaged or otherwise scanned to develop reference images or representations of the item 1122 at the receiving area 1104.

The storage area 1106 is configured to store the items 1122. The storage area 1106 may be arranged in various physical configurations. In one implementation, the storage area 1106 may include one or more aisles 1110. The aisle 1110 may be configured with, or defined by, inventory locations 1112 on one or both sides of the aisle 1110. The inventory locations 1112 may include one or more of a platform, a rack, a case, a cabinet, a bin, a floor location, or other suitable storage mechanisms for holding, supporting, or storing the items 1122. For example, the inventory locations 1112 may comprise the apparatus 100 with multiple accessories that provide a plurality of lanes.

The inventory locations 1112 may be affixed to the floor or another portion of the structure of the facility 1102. The inventory locations 1112 may also be movable such that the arrangements of aisles 1110 may be reconfigurable. In some implementations, the inventory locations 1112 may be configured to move independently of an outside operator. For example, the inventory locations 1112 may comprise a rack with a power source and a motor, operable by a computing device to allow the rack to move from one location within the facility 1102 to another.

One or more users 1114(1), 1014(2), . . . , 1014(U) and carts 1116(1), 1016(2), . . . , 1016(T) or other material handling apparatus may move within the facility 1102. For example, the user 1114 may move about within the facility 1102 to pick from or place the items 1122 in various inventory locations 1112, placing them in the cart 1116 for ease of transport. The cart 1116 is configured to carry or otherwise transport one or more items 1122. For example, the cart 1116 may include a basket, cart, bag, bin, and so forth. In other implementations, other material handling apparatuses such as robots, forklifts, cranes, aerial drones, and so forth, may move about the facility 1102 picking, placing, or otherwise moving the items 1122. For example, a robot may pick an item 1122 from a first inventory location 1112(1) and move the item 1122 to a second inventory location 1112(2).

While the storage area 1106 is depicted as having one or more aisles 1010, inventory locations 1112 storing the items 1122, sensors 1118, and so forth, it is understood that the receiving area 1104, the transition area 1108, or other areas of the facility 1102 may be similarly equipped. Furthermore, the arrangement of the various areas within the facility 1102 are depicted functionally rather than schematically. For example, in some implementations, multiple different receiving areas 1104, storage areas 1106, and transition areas 1108 may be interspersed rather than segregated in the facility 1102.

The facility 1102 may include, or be coupled to, an inventory management system 1120. The inventory management system 1120 is configured to interact with the user 1114 or devices such as sensors 1118, robots, material handling equipment, computing devices, and so forth, in one or more of the receiving area 1104, the storage area 1106, or the transition area 1108.

During operation of the facility 1102, the weight sensors 406 and other sensors 1118 may be configured to provide sensor data 1326, or information based on the sensor data 1326, to the inventory management system 1120. In addition to data obtained from the weight sensors 406 in the apparatus 100, the sensor data 1326 may include image data, non-image data, and so forth. The sensors 1118 may include, but are not limited to, weight sensors 406, cameras 1118(1), and so forth. The sensors 1118 may be stationary or mobile, relative to the facility 1102. For example, the facility 1102 may include cameras 1118(1) to obtain images of the user 1114 or other objects in the facility 1102. In another example, the inventory locations 1112 may contain weight sensors 406 to acquire weight sensor data of items 1122 stowed therein, cameras 1118(1) to acquire images of picking or placement of items 1122 on shelves, and so forth. The sensors 1118 are described in more detail below with regard to FIG. 12.

The inventory management system 1120 or other systems may use the sensor data 1326 to track the location of objects within the facility 1102, movement of the objects, or provide other functionality. Objects may include, but are not limited to, items 1122, users 1114, carts 1116, and so forth. For example, a series of images acquired by the cameras 1118(1) may indicate removal by the user 1114 of an item 1122 from a particular accessory or other location at the inventory location 1112 and placement of the item 1122 on or at least partially within the cart 1116.

The facility 1102 may be configured to receive different kinds of items 1122 from various suppliers and to store them until a customer orders or retrieves one or more of the items 1122. A general flow of items 1122 through the facility 1102 is indicated by the arrows of FIG. 10. Specifically, as illustrated in this example, items 1122 may be received from one or more suppliers, such as manufacturers, distributors, wholesalers, and so forth, at the receiving area 1104. In various implementations, the items 1122 may include merchandise, commodities, perishables, or any suitable type of item 1122, depending on the nature of the enterprise that operates the facility 1102.

Upon being received from a supplier at the receiving area 1104, the items 1122 may be prepared for storage in the storage area 1106. For example, in some implementations, items 1122 may be unpacked or otherwise rearranged. The inventory management system 1120 may include one or more software applications executing on a computer system to provide inventory management functions. These inventory management functions may include maintaining information indicative of the type, quantity, condition, cost, location, weight, or any other suitable parameters with respect to the items 1122. The items 1122 may be stocked, managed, or dispensed in terms of countable units, individual units, or multiple units, such as packages, cartons, crates, pallets, or other suitable aggregations. Alternatively, some items 1122, such as bulk products, commodities, and so forth, may be stored in continuous or arbitrarily divisible amounts that may not be inherently organized into countable units. Such items 1122 may be managed in terms of a measurable quantity such as units of length, area, volume, weight, time, duration, or other dimensional properties characterized by units of measurement. Generally speaking, a quantity of an item 1122 may refer to either a countable number of individual or aggregate units of an item 1122 or a measurable amount of an item 1122, as appropriate.

After arriving through the receiving area 1104, items 1122 may be stored within the storage area 1106. In some implementations, like items 1122 may be stored or displayed together in the inventory locations 1112 such as in bins, on shelves, hanging from pegboards, and so forth. In this implementation, all items 1122 of a given kind are stored in one inventory location 1112. In other implementations, like items 1122 may be stored in different inventory locations 1112. For example, to optimize retrieval of certain items 1122 having frequent turnover within a large physical facility 1102, those items 1122 may be stored in several different inventory locations 1112 to reduce congestion that might occur at a single inventory location 1112.

When a customer order specifying one or more items 1122 is received, or as a user 1114 progresses through the facility 1102, the corresponding items 1122 may be selected or "picked" from the inventory locations 1112 containing those items 1122. In various implementations, item picking may range from manual to completely automated picking. For example, in one implementation, a user 1114 may have a list of items 1122 they desire and may progress through the facility 1102 picking items 1122 from inventory locations 1112 within the storage area 1106 and placing those items 1122 into a cart 1116. In other implementations, employees of the facility 1102 may pick items 1122 using written or electronic pick lists derived from customer orders. These picked items 1122 may be placed into the cart 1116 as the employee progresses through the facility 1102.

After items 1122 have been picked, the items 1122 may be processed at a transition area 1108. The transition area 1108 may be any designated area within the facility 1102 where items 1122 are transitioned from one location to another or from one entity to another. For example, the transition area 1108 may be a packing station within the facility 1102. When the item 1122 arrives at the transition area 1108, the item 1122 may be transitioned from the storage area 1106 to the packing station. Information about the transition may be maintained by the inventory management system 1120.

In another example, if the items 1122 are departing the facility 1102, a list of the items 1122 may be obtained and used by the inventory management system 1120 to transition responsibility for, or custody of, the items 1122 from the facility 1102 to another entity. For example, a carrier may accept the items 1122 for transport with that carrier accepting responsibility for the items 1122 indicated in the list. In another example, a user 1114 may purchase or rent the items 1122 and remove the items 1122 from the facility 1102. During use of the facility 1102, the user 1114 may move about the facility 1102 to perform various tasks, such as picking or placing the items 1122 in the inventory locations 1112.

To facilitate operation of the facility 1102, the inventory management system 1120 is configured to use the sensor data 1326, such as data from weight sensors 406, image data, and other information such as item data 1332, physical layout data 1334, and so forth, to generate interaction data 1338.

The interaction data 1338 may provide information about an interaction, such as a pick of an item 1122 from the inventory location 1112, a place of an item 1122 to the inventory location 1112, a touch made to an item 1122 at the inventory location 1112, a gesture associated with an item 1122 at the inventory location 1112, and so forth. The interaction data 1338 may include one or more of the type of interaction, interaction location identifier indicative of where from the inventory location 1112 the interaction took place, item identifier, quantity change to the item 1122, user identifier, and so forth. The interaction data 1338 may then be used to further update the item data 1332. For example, the quantity of items 1122 on hand at a particular accessory may be changed based on an interaction that picks or places one or more items 1122.

The inventory management system 1120 may perform other operations, determining inventory to restock, determining user billing data, and so forth.

Figure 12:
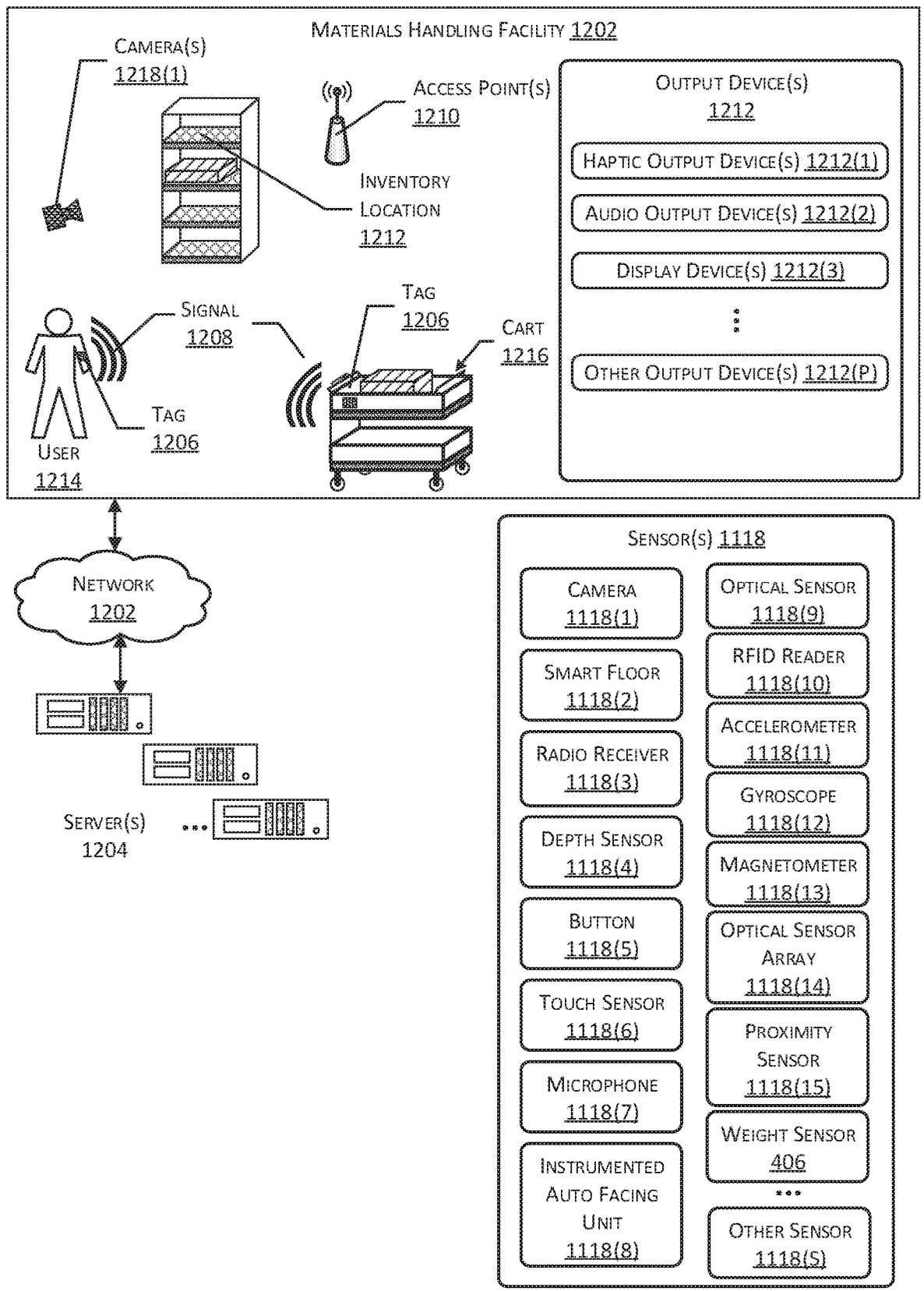
FIG. 12 is a block diagram illustrating additional details of the facility, according to some implementations.

FIG. 12 is a block diagram 1200 illustrating additional details of the facility 1102, according to some implementations. The facility 1102 may be connected to one or more networks 1202, which in turn connect to one or more computing devices, such as servers 1204. The network 1202 may include private networks such as an institutional or personal intranet, public networks such as the Internet, or a combination thereof. The network 1202 may utilize wired technologies (e.g., wires, fiber optic cables, and so forth), wireless technologies (e.g., radio frequency, infrared, acoustic, optical, and so forth), or other connection technologies. The network 1202 is representative of any type of communication network, including one or more of data networks or voice networks. The network 1202 may be implemented using wired infrastructure (e.g., copper cable, fiber optic cable, and so forth), a wireless infrastructure (e.g., cellular, microwave, satellite, and so forth), or other connection technologies.

The servers 1204 may be configured to execute one or more modules or software applications associated with the inventory management system 1120 or other systems. While the servers 1204 are illustrated as being in a location outside of the facility 1102, in other implementations, at least a portion of the servers 1204 may be located at the facility 1102. The servers 1204 are discussed in more detail below with regard to FIG. 13.

The users 1114, the carts 1116, items 1122, or other objects in the facility 1102 may be equipped with one or more tags 1206. The tags 1206 may be configured to emit a signal 1208. In one implementation, the tag 1206 may be a radio frequency identification (RFID) tag 1206 configured to emit a RF signal 1208 upon activation by an external signal. For example, the external signal may comprise a radio frequency signal or a magnetic field configured to energize or activate the RFID tag 1206. In another implementation, the tag 1206 may comprise a transmitter and a power source configured to power the transmitter. For example, the tag 1206 may comprise a Bluetooth Low Energy (BLE) transmitter and battery. In other implementations, the tag 1206 may use other techniques to indicate presence of the tag 1206. For example, an acoustic tag 1206 may be configured to generate an ultrasonic signal 1208, which is detected by corresponding acoustic receivers. In yet another implementation, the tag 1206 may be configured to emit an optical signal 1208.

The inventory management system 1120 may be configured to use the tags 1206 for one or more of identification of the object, determining a location of the object, and so forth. For example, the user 1114 may wear tags 1206, the carts 1116 may have tags 1206 affixed, items 1122 may have tags 1206 affixed to their packaging, and so forth, which may be read and, based at least in part on signal strength, used to determine one or more of identity or location.

Generally, the inventory management system 1120 or other systems associated with the facility 1102 may include any number and combination of input components, output components, and servers 1204.

The one or more sensors 1118 may be arranged at one or more locations within the facility 1102. For example, the sensors 1118 may be mounted on or within a floor, wall, at a ceiling, at an inventory location 1112, on a cart 1116, may be carried or worn by a user 1114, and so forth.

The sensors 1118 may include one or more cameras 1118(1) or other imaging sensors. The one or more cameras 1118(1) may include imaging sensors configured to acquire images of a scene. The cameras 1118(1) are configured to detect light in one or more wavelengths including, but not limited to, terahertz, infrared, visible, ultraviolet, and so forth. The cameras 1118(1) may comprise charge coupled devices (CCD), complementary metal oxide semiconductor (CMOS) devices, microbolometers, and so forth. The inventory management system 1120 may use image data acquired by the cameras 1118(1) during operation of the facility 1102. For example, the inventory management system 1120 may identify items 1122, users 1114, carts 1116, and so forth, based at least in part on their appearance within the image data acquired by the cameras 1118(1). The cameras 1118(1) may be mounted in various locations within the facility 1102. For example, cameras 1118(1) may be mounted overhead, on inventory locations 1112, may be worn or carried by the user 1114, may be affixed to carts 1116, and so forth.

The sensors 1118 may include a smart floor 1118(2). The smart floor 1118(2) is able to provide information about the location of objects, such as a user 1114, carts 1116, and so forth. This information may include identifying the object, determining a location of the object, tracking the object, and so forth. The smart floor 1118(2) may utilize smart floor devices that comprise one or more of transmitters or receivers that radiate or receive electromagnetic signals from antennas located at or underneath the floor. Based on information about what antenna radiated a signal and what antenna acquired the signal, information about an object on or above the floor may be determined. For example, the smart floor 1118(2) may comprise sensing elements, or segments. Each segment may include an antenna that is coupled to one or more of a transmitter or a receiver. During operation, the segment may transmit an electromagnetic signal 1208 that is radiated by the antenna, receive an electromagnetic signal that is acquired by the antenna, or both. In some implementations the smart floor 1118(2) may operate as a physically large touch sensor that is deployed at floor level. The electromagnetic signals 1208 provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 1118(2) may be used to provide object representation movement data. For example, the output from the segments obtained during a particular window of time may be processed in a fashion similar to the image data.

One or more radio receivers 1118(3) may also be included as sensors 1118. In some implementations, the radio receivers 1118(3) may be part of transceiver assemblies. The radio receivers 1118(3) may be configured to acquire RF signals 1208 associated with RFID, Wi-Fi, Bluetooth, ZigBee, 4G, LTE, or other wireless data transmission technologies. The radio receivers 1118(3) may provide information associated with data transmitted via radio frequencies, signal strength of RF signals 1208, and so forth. For example, information from the radio receivers 1118(3) may be used by the inventory management system 1120 to determine a location of an RF source, such as a transmitter carried by the user 1114, a transmitter on the cart 1116, a tag 1206 on the item 1122, and so forth.

One or more depth sensors 1118(4) may also be included in the sensors 1118. The depth sensors 1118(4) are configured to acquire spatial or three-dimensional (3D) data, such as depth information, about objects within a field-of-view (FOV). The depth sensors 1118(4) may include range cameras, lidar systems, sonar systems, radar systems, structured light systems, stereo vision systems, optical interferometry systems, and so forth. The inventory management system 1120 may use the 3D data acquired by the depth sensors 1118(4) to identify objects, determine a location of an object in 3D real space, identify a user 1114, and so forth.

One or more buttons 1118(5) may be configured to accept input from the user 1114. The buttons 1118(5) may comprise mechanical, capacitive, optical, or other mechanisms. For example, the buttons 1118(5) may comprise mechanical switches configured to accept an applied force from a touch of the user 1114 to generate an input signal. The inventory management system 1120 may use data from the buttons 1118(5) to receive information from the user 1114. For example, the cart 1116 may be configured with a button 1118(5) to accept input from the user 1114 and send information indicative of the input to the inventory management system 1120.

The sensors 1118 may include one or more touch sensors 1118(6). The touch sensors 1118(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 1120 may use data from the touch sensors 1118(6) to receive information from the user 1114. For example, the touch sensor 1118(6) may be integrated with the cart 1116 to provide a touchscreen with which the user 1114 may select, from a menu, one or more particular items 1122 for picking, enter a manual count of items 1122 at an inventory location 1112, and so forth.

One or more microphones 1118(7) may be configured to acquire information indicative of sound present in the environment. In some implementations, arrays of microphones 1118(7) may be used. These arrays may implement beam-forming techniques to provide for directionality of gain. The inventory management system 1120 may use the one or more microphones 1118(7) to acquire information from acoustic tags 1206, accept voice input from the user 1114, determine ambient noise level, and so forth.

The sensors 1118 may include instrumented auto facing units (IAFUs) 1118(8). The IAFU 1118(8) may comprise a position sensor configured to provide data indicative of displacement of a pusher. As an item 1122 is removed from the IAFU 1118(8), the pusher moves, such as under the influence of a spring, and pushes the remaining items 1122 in the IAFU 1118(8) to the front of the inventory location 1112. By using data from the position sensor, and given item data 1332 such as a depth of an individual item 1122, a count may be determined, based on a change in position data. For example, if each item 1122 is 1 inch deep, and the position data indicates a change of 10 inches, the quantity held by the IAFU 1118(8) may have changed by 10 items 1122. This count information may be used to confirm or provide a cross check for a count obtained by other means, such as analysis of the sensor data from the weight sensors 406.

The sensors 1118 may include one or more optical sensors 1118(9). The optical sensors 1118(9) may be configured to provide data indicative of one or more of color or intensity of light impinging thereupon. For example, the optical sensor 1118(9) may comprise a photodiode and associated circuitry configured to generate a signal 1208 or data indicative of an incident flux of photons. As described below, the optical sensor array 1118(14) may comprise a plurality of the optical sensors 1118(9). The optical sensors 1118(9) may include photodiodes, photoresistors, photovoltaic cells, quantum dot photoconductors, bolometers, pyroelectric infrared detectors, and so forth. For example, the optical sensor 1118(9) may use germanium photodiodes to detect infrared light.

One or more radio frequency identification (RFID) readers 1118(10), near field communication (NFC) systems, and so forth, may be included as sensors 1118. For example, the RFID readers 1118(10) may be configured to read the RF tags 1206. Information acquired by the RFID reader 1118(10) may be used by the inventory management system 1120 to identify an object associated with the RF tag 1206 such as the item 1122, the user 1114, the cart 1116, and so forth. For example, based on information from the RFID readers 1118(10) detecting the RF tag 1206 at a particular inventory location, an item 1122 being placed or picked may be determined.

The sensors 1118 may include one or more accelerometers 1118(11), which may be worn or carried by the user 1114, mounted to the cart 1116, and so forth. The accelerometers 1118(11) may provide information such as the direction and magnitude of an imposed acceleration. Data such as rate of acceleration, determination of changes in direction, speed, and so forth, may be determined using the accelerometers 1118(11).

A gyroscope 1118(12) may provide information indicative of rotation of an object affixed thereto. For example, the cart 1116 or other objects may be equipped with a gyroscope 1118(12) to provide data indicative of a change in orientation of the object.

A magnetometer 1118(13) may be used to determine an orientation by measuring ambient magnetic fields, such as the terrestrial magnetic field. The magnetometer 1118(13) may be worn or carried by the user 1114, mounted to the cart 1116, and so forth. For example, the magnetometer 1118(13) mounted to the cart 1116 may act as a compass and provide information indicative of which direction the cart 1116 is oriented.

An optical sensor array 1118(14) may comprise one or optical sensors 1118(9). The optical sensors 1118(9) may be arranged in a regular, repeating, or periodic two-dimensional arrangement such as a grid. The optical sensor array 1118(14) may generate image data. For example, the optical sensor array 1118(14) may be arranged within or below an inventory location 1112 and obtain information about shadows of items 1122, hand of the user 1114, and so forth.

The sensors 1118 may include proximity sensors 1118(15) used to determine presence of an object, such as the user 1114, the cart 1116, and so forth. The proximity sensors 1118(15) may use optical, electrical, ultrasonic, electromagnetic, or other techniques to determine a presence of an object. In some implementations, the proximity sensors 1118(15) may use an optical emitter and an optical detector to determine proximity. For example, an optical emitter may emit light, a portion of which may then be reflected by the object back to the optical detector to provide an indication that the object is proximate to the proximity sensor 1118(15). In other implementations, the proximity sensors 1118(15) may comprise a capacitive proximity sensor 1118(15) configured to provide an electrical field and determine a change in electrical capacitance due to presence or absence of an object within the electrical field.

The proximity sensors 1118(15) may be configured to provide sensor data 1326 indicative of one or more of a presence or absence of an object, a distance to the object, or characteristics of the object. An optical proximity sensor 1118(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 1118 such as a camera 1118(1). Based on an apparent distance between the features of the structured light pattern, the distance to the object may be calculated. Other techniques may also be used to determine distance to the object. In another example, the color of the reflected light may be used to characterize the object, such as skin, clothing, cart 1116, and so forth.

The one or more weight sensors 406 are configured to measure the weight of a load, such as the item 1122, the cart 1116, or other objects. The weight sensors 406 may be configured to measure the weight of the load at one or more of the inventory locations 1112, the cart 1116, on the floor of the facility 1102, and so forth. For example, a fixture of the inventory location 1112 may include a plurality of weight sensors 406. The weight sensors 406 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 406 may operate as transducers that generate one or more signals based on an applied force, such as that of the load due to gravity. For example, the weight sensor 406 may comprise a load cell having a strain gauge and a structural member that deforms slightly when weight is applied. By measuring a change in the electrical characteristic of the strain gauge, such as capacitance or resistance, the weight may be determined. In another example, the weight sensor 406 may comprise a piezoelectric material affixed to a portion of the apparatus 100. As a load on the portion of the apparatus 100 changes, the piezoelectric material may produce an output signal. This output signal may be processed to determine a change in weight. In another example, the weight sensor 406 may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 1120 may use the data acquired by the weight sensors 406 to identify an object, determine a change in the quantity of objects, determine a location of an object, maintain shipping records, and so forth.

The sensors 1118 may include other sensors 1118(S) as well. For example, the other sensors 1118(S) may include light curtains, ultrasonic rangefinders, thermometers, barometric sensors, hygrometers, and so forth.

In some implementations, the sensors 1118 may include hardware processors, memory, and other elements configured to perform various functions. For example, the cameras 1118(1) may be configured to generate image data, send the image data to another device such as the server 1204, and so forth.

The facility 1102 may include one or more access points 1210 configured to establish one or more wireless networks. The access points 1210 may use Wi-Fi, NFC, Bluetooth, or other technologies to establish wireless communications between a device and the network 1202. The wireless networks allow the devices to communicate with one or more of the sensors 1118, the inventory management system 1120, the tag 1206, a communication device of the cart 1116, or other devices.

Output devices 1212 may also be provided in the facility 1102. The output devices 1212 are configured to generate signals 1208, which may be perceived by the user 1114 or detected by the sensors 1118. In some implementations, the output devices 1212 may be used to provide illumination of the optical sensor array 1118(14).

Haptic output devices 1212(1) are configured to provide a signal 1208 that results in a tactile sensation to the user 1114. The haptic output devices 1212(1) may use one or more mechanisms such as electrical stimulation or mechanical displacement to provide the signal 1208. For example, the haptic output devices 1212(1) may be configured to generate a modulated electrical signal, which produces an apparent tactile sensation in one or more fingers of the user 1114. In another example, the haptic output devices 1212(1) may comprise piezoelectric or rotary motor devices configured to provide a vibration, which may be felt by the user 1114.

One or more audio output devices 1212(2) may be configured to provide acoustic output. The acoustic output includes one or more of infrasonic sound, audible sound, or ultrasonic sound. The audio output devices 1212(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 1212(3) may be configured to provide output, which may be seen by the user 1114 or detected by a light-sensitive sensor such as a camera 1118(1) or an optical sensor 1118(9). In some implementations, the display devices 1212(3) may be configured to produce output in one or more of infrared, visible, or ultraviolet light. The output may be monochrome or in color. The display devices 1212(3) may be one or more of emissive, reflective, microelectromechanical, and so forth. An emissive display device 1212(3), such as using LEDs, is configured to emit light during operation. In comparison, a reflective display device 1212(3), such as using an electrophoretic element, relies on ambient light to present an image. Backlights or front lights may be used to illuminate non-emissive display devices 1212(3) to provide visibility of the output in conditions where the ambient light levels are low.

The display devices 1212(3) may be located at various points within the facility 1102. For example, the addressable displays may be located on inventory locations 1112, carts 1116, on the floor of the facility 1102, and so forth.

Other output devices 1212(P) may also be present. For example, the other output devices 1212(P) may include scent/odor dispensers, document printers, 3D printers or fabrication equipment, and so forth.

Figure 13:
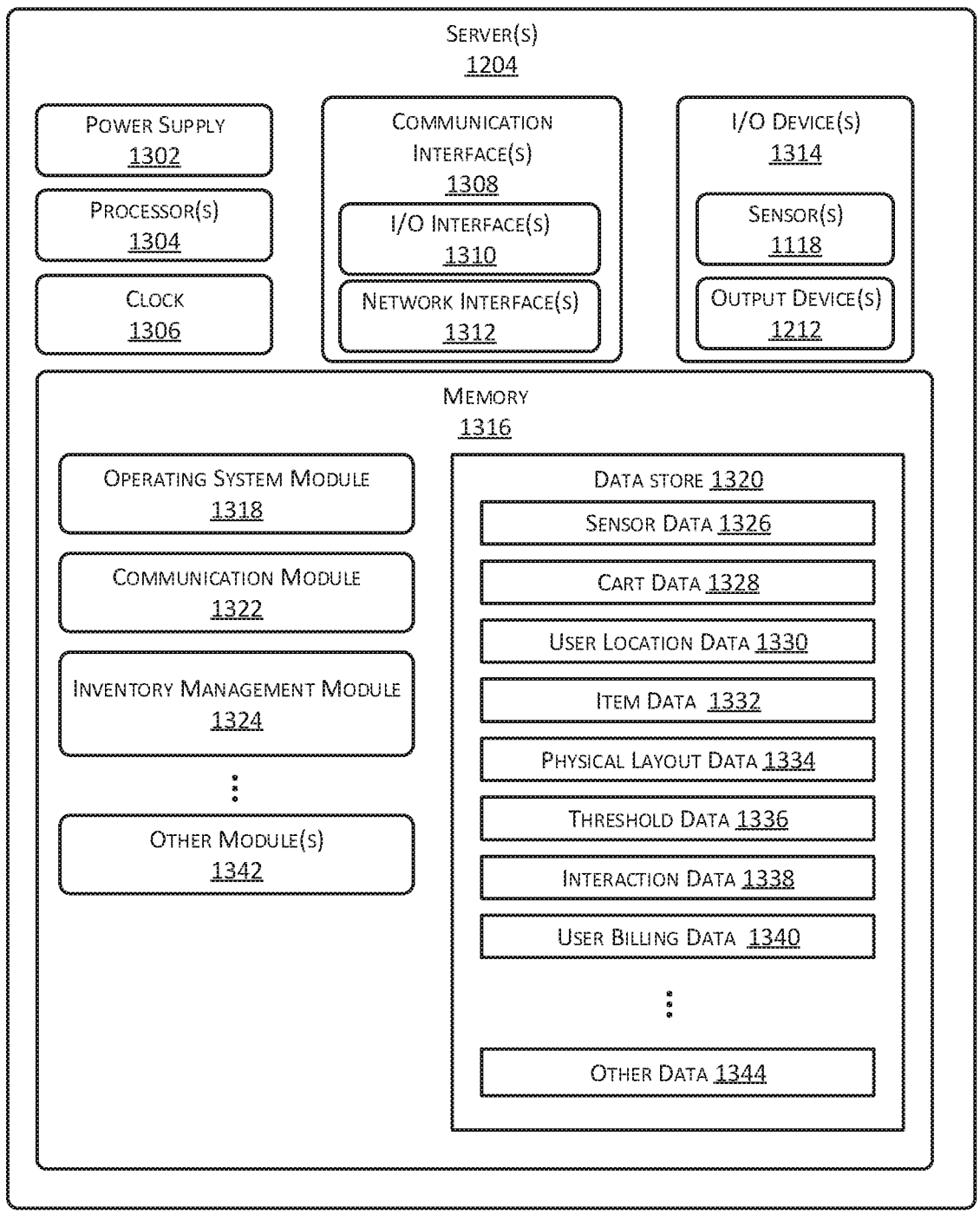
FIG. 13 is a block diagram of a server to support operation of the facility, according to some implementations.

FIG. 13 illustrates a block diagram 1300 of a server 1204 configured to support operation of the facility 1102, according to some implementations. The server 1204 may be physically present at the facility 1102, may be accessible by the network 1202, or a combination of both. The server 1204 does not require end-user knowledge of the physical location and configuration of the system that delivers the services. Common expressions associated with the server 1204 may include "on-demand computing", "software as a service (SaaS)", "platform computing", "network-accessible platform", "cloud services", "data centers", and so forth. Services provided by the server 1204 may be distributed across one or more physical or virtual devices.

One or more power supplies 1302 may be configured to provide electrical power suitable for operating the components in the server 1204. The one or more power supplies 1302 may comprise batteries, capacitors, fuel cells, photovoltaic cells, wireless power receivers, conductive couplings suitable for attachment to an external power source such as provided by an electric utility, and so forth. The server 1204 may include one or more hardware processors 1304 (processors) configured to execute one or more stored instructions. The processors 1304 may comprise one or more cores. One or more clocks 1306 may provide information indicative of date, time, ticks, and so forth. For example, the processor 1304 may use data from the clock 1306 to associate a particular interaction with a particular point in time.

The server 1204 may include one or more communication interfaces 1308 such as input/output (I/O) interfaces 1310, network interfaces 1312, and so forth. The communication interfaces 1308 enable the server 1204, or components thereof, to communicate with other devices or components. The communication interfaces 1308 may include one or more I/O interfaces 1310. The I/O interfaces 1310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1310 may couple to one or more I/O devices 1314. The I/O devices 1314 may include input devices such as one or more of a sensor 1118, keyboard, mouse, scanner, and so forth. The I/O devices 1314 may also include output devices 1212 such as one or more of a display device 1212(3), printer, audio speakers, and so forth. In some embodiments, the I/O devices 1314 may be physically incorporated with the server 1204 or may be externally placed.

The network interfaces 1312 may be configured to provide communications between the server 1204 and other devices, such as the carts 1116, routers, access points 1210, and so forth. The network interfaces 1312 may include devices configured to couple to personal area networks (PANs), local area networks (LANs), wireless local area networks (WLANS), wide area networks (WANs), and so forth. For example, the network interfaces 1312 may include devices compatible with Ethernet, Wi-Fi, Bluetooth, ZigBee, and so forth.

The server 1204 may also include one or more busses or other internal communications hardware or software that allow for the transfer of data between the various modules and components of the server 1204.

As shown in FIG. 13, the server 1204 includes one or more memories 1316. The memory 1316 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1316 provides storage of computer-readable instructions, data structures, program modules, and other data for the operation of the server 1204. A few example functional modules are shown stored in the memory 1316, although the same functionality may alternatively be implemented in hardware, firmware, or as a system on a chip (SoC).

The memory 1316 may include at least one operating system (OS) module 1318. The OS module 1318 is configured to manage hardware resource devices such as the I/O interfaces 1310, the I/O devices 1314, the communication interfaces 1308, and provide various services to applications or modules executing on the processors 1304. The OS module 1318 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 1316 may be a data store 1320 and one or more of the following modules. These modules may be executed as foreground applications, background tasks, daemons, and so forth. The data store 1320 may use a flat file, database, linked list, tree, executable code, script, or other data structure to store information. In some implementations, the data store 1320 or a portion of the data store 1320 may be distributed across one or more other devices including the servers 1204, network attached storage devices, and so forth.

A communication module 1322 may be configured to establish communications with one or more of the carts 1116, sensors 1118, display devices 1212(3), other servers 1204, or other devices. The communications may be authenticated, encrypted, and so forth.

The memory 1316 may store an inventory management module 1324. The inventory management module 1324 is configured to provide the inventory functions as described herein with regard to the inventory management system 1120. For example, the inventory management module 1324 may track items 1122 between different inventory locations 1112, to and from the carts 1116, generate restocking orders, direct operation of robots within the facility 1102, and so forth. The inventory management module 1324 may access sensor data 1326 such as one or more of weight data from the weight sensors 406, image data, received data, and so forth.

Information used by the inventory management module 1324 may be stored in the data store 1320. For example, the data store 1320 may be used to store the sensor data 1326, cart data 1328, user location data 1330, item data 1332, physical layout data 1334, threshold data 1336, interaction data 1338, user billing data 1340, and so forth.

The cart data 1328 comprises information about the items 1122 that are determined to be in the custody of the user 1114. For example, the cart data 1328 may indicate the items 1122 that are within the cart 1116 that is associated with the account of the user 1114, currently being carried by the user 1114, and so forth. The cart data 1328 may be based at least in part on the interaction data 1338. For example, the interaction data 1338 may be associated with a particular user 1114, changing the contents of the cart data 1328 based on the interaction.

The inventory management module 1324 may generate the user location data 1330 that is indicative of the location of the user 1114 within the facility 1102. For example, the inventory management module 1324 may use image data obtained by the cameras 1118(1) to determine a location of the user 1114. In other implementations, other techniques may be used for determining the user location data 1330. For example, data from the smart floor 1118(2) may be used to determine the location of the user 1114. Based on the user location data 1330 and the interaction data 1338, a particular interaction may be associated with an account of a particular user 1114. For example, if the user location data 1330 indicates that the user 1114 is present in front of inventory location 1112(492) at time 17:47:20 and the interaction data 1338 indicates a pick of a quantity of one item 1122(D) from bracket 128(7) on apparatus 100(1) of inventory location 1112(492) at 17:47:27, the user 1114 may be billed for that pick.

The threshold data 1336 comprises the various thresholds used by the system. For example, the threshold data 1336 may specify values for confidence thresholds that are used to determine if a hypothesis is deemed suitable to be used to generate the interaction data 1338.

The inventory management module 1324 may generate user billing data 1340 based on the cart data 1328. For example, when a user 1114 leaves the facility 1102, the items in the cart data 1328 and their respective quantities may be used to generate user billing data 1340. In some implementations, the user billing data 1340 may be used to bill a payment account associated with the user 1114.

The inventory management module 1324 may utilize the physical layout data 1334 during operation. The physical layout data 1334 may provide information indicative of where cameras 1118(1), weight sensors 406, antennas for the radio receivers 1118(3), inventory locations 1112, and so forth are in the facility 1102 with respect to one another. For example, the physical layout data 1334 may comprise information representative of a map or floor plan of the facility 1102 with relative positions of inventory locations 1112 and cameras 1118(1).

The inventory management module 1324 may process the sensor data 1326 and generate output data. For example, based on the interaction data 1338, a quantity of a type of item 1122 at a particular inventory location 1112 may drop below a threshold restocking level. The system may generate output data comprising a restocking order indicative of the inventory location 1112 and a quantity needed to replenish stock to a predetermined level. The restocking order may then be used to direct a robot to restock that inventory location 1112.

Other modules 1342 may also be present in the memory 1316 as well as other data 1344 in the data store 1320.

The implementations described above are provided for illustration, and not necessarily as limitations. For example, the fixtures may support different numbers of accessories, combinations of different accessories on the same fixture, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques and devices described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An apparatus comprising:
   an extruded crossbar having a front side, a back side, a left end, a right end, a top side, and a bottom side, wherein the crossbar further comprises:
      a front portion on the front side of the crossbar, the front portion comprising:
         a vertical lower front surface,
         a vertical upper front surface,
         a slatwall hook mounting slot between the vertical lower front surface and the vertical upper front surface, and
         a plurality of pegboard hook holes in the vertical lower front surface, wherein the holes are parallel to the slatwall hook mounting slot; and
      an upper portion on the top side of the crossbar, the upper portion comprising:
         a ridge comprising a horizontal upper front surface proximate to the vertical upper front surface,
         a horizontal upper rear surface, and
         a saddle hook channel between the ridge and the horizontal upper rear surface;
   a left load cell:
      having a first end affixed to the left end of the crossbar, and
      having a second end affixed to a left mounting bracket; and
   a right load cell:
      having a first end affixed to the right end of the crossbar, and
      having a second end affixed to a right mounting bracket.

2. The apparatus of claim 1, further comprising one or more of:
   a first accessory having one or more pegboard hooks inserted into one or more of the plurality of pegboard hook holes,
   a second accessory having a slatwall hook inserted into the slatwall hook mounting slot, or
   a third accessory having a saddle hook inserted into the saddle hook channel.

3. An apparatus comprising:
   a crossbar having a front side, a back side, a left end, a right end, a top side, and a bottom side, the crossbar comprising:
      a first slot in a front surface on the front side;
      a first plurality of holes in the front surface; and
      a first channel on the top side.

4. The apparatus of claim 3, further comprising one or more of:
   a spacer having:
      a first face and a second face that is opposite the first face; and
      a second plurality of holes passing through the first face and the second face;
   and wherein each hole of the second plurality of holes is a first width;
   a crossbar bracket having:
      a first portion affixed to the crossbar,
      a third face that is in contact with the first face of the spacer; and
      a third plurality of holes passing through the third face, wherein each hole of the third plurality of holes is the first width;
   a mounting bracket having:
      a fourth face that is in contact with the second face of the spacer;
      one or more mechanical engagements features to engage a support structure; and
      a third plurality of holes in the fourth face; and
   a plurality of fasteners, wherein each fastener has a diameter that is less than the first width and an individual fastener passes through one of the first plurality of holes, a corresponding one of the second plurality of holes, and into a corresponding one of the third plurality of holes.

5. The apparatus of claim 3, further comprising one or more of:
   a first weight sensor:
      having a first end affixed to a first end of the crossbar, and
      having a second end affixed to a first mounting bracket; or
   a second weight sensor:
      having a first end affixed to a second end of the crossbar, and
      having a second end affixed to a second mounting bracket.

6. The apparatus of claim 5, the first weight sensor comprising one or more of:
   a load cell, or
   a piezoelectric sensor.

7. The apparatus of claim 5, the crossbar further comprising an extruded metal; and
   first electronics;

a first wiring harness connecting the first weight sensor to the first electronics, wherein at least a portion of the first wiring harness is affixed to a surface of the crossbar; and a second wiring harness connecting the second weight sensor to the first electronics, wherein at least a portion of the second wiring harness is affixed to a surface of the crossbar.

8. The apparatus of claim 3, wherein the crossbar is fabricated without cross sectional voids.

9. The apparatus of claim 3, wherein the first plurality of holes are spaced 25.4 millimeters (mm) on center and have a diameter of at least 7 mm and at most 10 mm.

10. The apparatus of claim 3, further comprising:
a first mounting bracket connected to a first end of the crossbar;
a second mounting bracket connected to a second end of the crossbar; and
wherein the first mounting bracket and the second mounting bracket comprising one or more of:
a shelf hook,
a wall plate, or
a wire grid hook.

11. The apparatus of claim 3, wherein the first slot has a first slot height; and
the crossbar further comprising:
a second slot in the front surface on the front side, wherein the second slot is parallel to the first slot and the second slot has a second slot height different from the first slot height.

12. The apparatus of claim 3, the crossbar having a hole extending from the front side of the front surface through the crossbar.

13. An apparatus comprising:
a first mounting bracket; and
a crossbar connected to the first mounting bracket, the crossbar comprising:
a first slot in a front surface on a front side of the crossbar;
a first plurality of holes in the front surface; and
a first ridge on a top side of the crossbar.

14. The apparatus of claim 13, wherein the connection between the crossbar and the first mounting bracket permits movement between the first mounting bracket and the crossbar.

15. The apparatus of claim 13, wherein the first slot, the first plurality of holes, and the first ridge are parallel to a long axis of the crossbar.

16. The apparatus of claim 13, further comprising a first weight sensor having a first end affixed to a first end of the first mounting bracket and a second end affixed to the crossbar.

17. The apparatus of claim 13, the crossbar further comprising metal; and
a first weight sensor affixed to the crossbar;
first electronics; and
a first wiring harness connecting the first weight sensor to the first electronics, wherein at least a portion of the first wiring harness is affixed to a metallic surface of the crossbar.

18. The apparatus of claim 13, wherein the first plurality of holes are spaced 25.4 millimeters on center and have a diameter of at least 7 mm and at most 10 mm.

19. The apparatus of claim 13, wherein the first slot comprises a slot entry having a first width and a slot interior having a second width that is greater than the first width.

20. The apparatus of claim 13, wherein a first edge of the first slot is at an angle of between 70 and 30 degrees relative to the front surface; and
a second edge of the first slot is at an angle of between 85 and 95 degrees relative to the front surface.

\* \* \* \* \*